United States Patent [19]

Dejaiffe et al.

[11] 4,320,244

[45] Mar. 16, 1982

[54] MELTING FURNACE FOR THE PRODUCTION OF MINERAL WOOL INSULATION

[75] Inventors: Robert Dejaiffe, Aurora; Edward L. Kells, Batavia, both of Ill.

[73] Assignee: Forty-Eight Insulations, Inc., Aurora, Ill.

[21] Appl. No.: 125,798

[22] Filed: Feb. 29, 1980

[51] Int. Cl.³ ............................................. C03B 5/02
[52] U.S. Cl. ............................................. 13/6; 13/35
[58] Field of Search ..................... 13/6, 23, 32, 35, 31

[56] References Cited

U.S. PATENT DOCUMENTS

| | | | |
|---|---|---|---|
| 1,674,947 | 6/1928 | Buncer et al. | 13/23 |
| 2,042,560 | 6/1936 | Stewart | 13/6 |
| 2,263,848 | 11/1941 | Keaney | 13/6 |
| 3,849,587 | 11/1974 | Hatch et al. | 13/35 |
| 3,973,076 | 8/1976 | Scott, Jr. et al. | 13/35 |

Primary Examiner—B. A. Reynolds
Assistant Examiner—Bernard Roskoski

Attorney, Agent, or Firm—Marvin A. Naigur; John E. Wilson; John J. Herguth, Jr.

[57] ABSTRACT

A melting furnace for the production of mineral wool insulation in the nature of a receptacle closed by a cover or crown through which spaced carbon electrodes extend from an external support and also through which particulate stock material is introduced over a substantial area of a melt contained in the receptacle. The receptacle of the furnace is defined by a substantially sealed external shell having an inner lining of carbon brick covering the floor and extending upwardly on the sidewalls thereof to an upper limit or edge defined by the plane of the top surface of liquid melt maintained in the furnace. An outer lining of carbon paste is sandwiched between the inner brick lining and the outer sealed shell. The inner lining is capped with a ring of refractory and a water cooling conduit is embedded in the outer lining at the plane of the liquid level to develop a fused or solidified glass lining only at the juncture of the refractory ring and the inner lining of carbon brick.

16 Claims, 4 Drawing Figures

MELTING FURNACE FOR THE PRODUCTION OF MINERAL WOOL INSULATION

BACKGROUND OF THE INVENTION

This invention relates to the production of mineral wool insulation and more particularly, it concerns an improved furnace for melting raw materials used in the manufacture of high temperature mineral wool insulation.

In the manufacture of high temperature mineral wool insulation such as rock wool blankets for insulating boilers and other surfaces heated to temperatures of 1200° F., from blast furnace slag, basalt and other low-cost, primarily siliceous raw materials, a liquid or glass melt is first formed for subsequent fiberizing to provide the insulation product. Because of the high temperatures required to melt the raw materials or rock and in part also because of the composition of the material, present melting processes are limited largely to the use of metallurgical cupolas in which the rock is placed directly onto a bed of burning coke so that on melting, the molten rock or glass drips out of the bed for collection and passage to a fiber forming station or a fiberizer.

The process presently in use is fraught with numerous problems including increasingly high costs, limited range of glass compositions capable of being used, environmental contamination and inconsistencies in the product formed. For example, the availability of coke sufficiently high in quality to withstand handling in the melting process without loss due to coke breakage and to be free of impurities which could contaminate the glass melt has steadily deteriorated with the result that increased costs of the coke itself represent substantially added costs to the known process. Irregularity in the operation of the cupola adversely affects melting and delivery rates to the fiberizer. In the known process, for example, the cupola is charged periodically at fifteen to twenty minute intervals with additional coke and rock. Such a loading cycle results in a thermal cycle in the cupola which, in turn, causes inconsistent melting and delivery rates. Because of the requirement for combustion air to pass through the coke and rock bed, all of the particulate and chemical emissions of the combustion process are passed from the cupola and require treatment for compliance with environmental standards. The requirement for passing combustion air through the bed limits the size of rock and coke particles in the sense that they must be large enough to allow passage of the combustion air. Also, there is a limit to the range of rock composition that can be effectively melted and assimilated in the stream of glass which drips from the bed.

Although many of the problems presented by the present process of melting slag and low-cost rock for the production of high temperature mineral wool insulation could be avoided by the substitution of an electric melting furnace for the cupola of the present process, a combination of the high temperatures required to melt and retain the molten rock or raw materials for delivery to the fiberizer as well as the chemically active character of the glass formed from these raw materials is severely limiting. For example, the glass formed from slag and other comparable low-cost rock materials has substantially alkaline characteristics. When heated to the temperatures required to provide a homogenous, low viscosity melt, the melt reacts with and deteriorates most types of refractory linings needed to prevent loss of heat from the melt to the exterior of the receptacle or furnace in which the melt is formed. In light of this characteristic, furnace wall cooling techniques have been attempted to maintain a temperature equilibrium by which the molten glass is contained within a lining constituted by a solidified layer of the same glass. The high heat losses experienced with this type of electric melting furnace, however, results in an economic deterrent to the use of an electric melting furnace for the cupola of the present process. While the problems associated with the cupola of the presently used process, therefore, justify serious consideration of an electric furnace melting system, particularly from the standpoint of attaining a more consistent product by virtue of the added facility for temperature controls and continuity provided by such systems, an acceptable electric melting furnace has not been available for handling low-cost materials of the type aforementioned.

SUMMARY OF THE INVENTION

In accordance with the present invention, an electric melting furnace is provided by which low-cost mineral stock material or rock such as blast furnace slag, basalt, feldspar or electrophos slag, in particulate form, is converted to a homogenous, low viscosity glass melt for constant delivery to a fiberizer, for example, in the production of mineral wool. High operating efficiencies are attainable as a result of an insulation system which minimizes heat loss from an interior melting chamber and which is highly resistive to the corrosive effects of high temperature melts formed from such stock materials.

The furnace structure is in the nature of a receptacle closed by a cover or crown through which spaced carbon electrodes extend from an external support and also through which particulate stock material, preferably dried and preheated to temperatures only slightly less than the melting temperatures thereof, is introduced to discrete areas on the top of a melt contained in the receptacle defined melt chamber. The receptacle includes a substantially sealed external steel shell, an inner lining of carbon brick covering the floor of the receptacle and extending upwardly on the sidewalls thereof to an upper limit or edge defined by a plane lying at the upper level of liquid melt to be maintained in the furnace. The inner lining between the carbon brick and the upper edge of the receptacle to be engaged by the crown is established by a ring of cast refractory, preferably bubbled alumina. The space between the inner lining and the exterior shell is filled with a tamped external lining of paste-like carbon to retain the carbon brick interior lining in place, to be resistive to melt which may leak through the carbon brick inner lining and also to absorb or otherwise prevent air, particularly oxygen from passing inwardly to the carbon brick interior lining. The crown is constituted also by a steel exterior shell from which an inner crown lining of cast refractory is suspended against an outer fiber insulation fill.

An outlet slot is positioned at the upper edge of the carbon brick lining to maintain the level of melt in the furnace at an essentially constant level. Deterioration of the carbon brick through oxidation at the upper edge thereof as well as deterioration of the cast refractory ring at the top of the carbon brick through reaction with the high temperature melt is limited by an isolated cooling ring situated in the region of the outer lining at the plane defined by the top of the liquid melt. The cooling ring establishes a thermal equilibrium in the melt at the upper region thereof so that a narrow band of solidified melt or glass protects both the bubbled alumina refractory ring and the upper edge of the carbon brick from the liquid melt.

Among the objects of the invention are therefore: the provision of an improved melting furnace for the conversion of low-cost mineral stock material to a homogenous glass melt in the production of mineral wool; the provision of such a melting furnace in which heat loss from the melt is minimized; the provision of such a melting furnace in which the melt chamber is substantially isolated from the atmosphere to minimize oxidation of carbon electrodes and to facilitate the use of a highly effective carbon lining; the provision of such a melting furnace having an improved insulative lining system which optimizes the use of carbon and cast refractories; and the provision of such a melting furnace having a system for protecting carbon and cast refractory linings from the corrosive effects of the high temperature glass melt.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
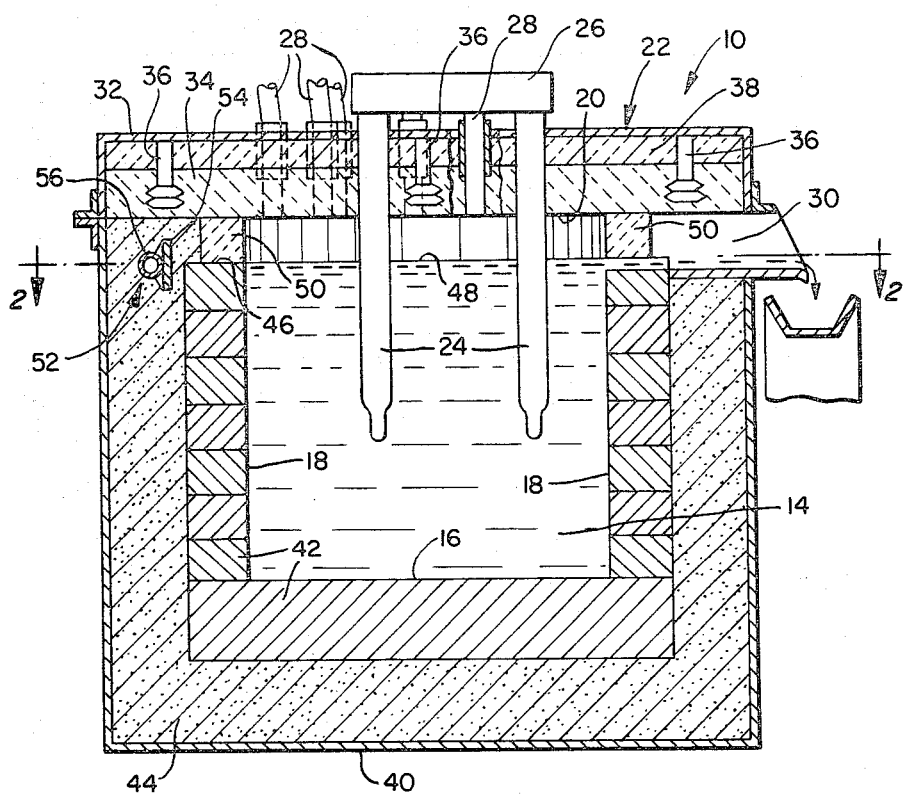
FIG. 1 is a vertical cross-section through a melting furnace embodiment of the invention on line 1—1 of FIG. 2.
Figure 2:
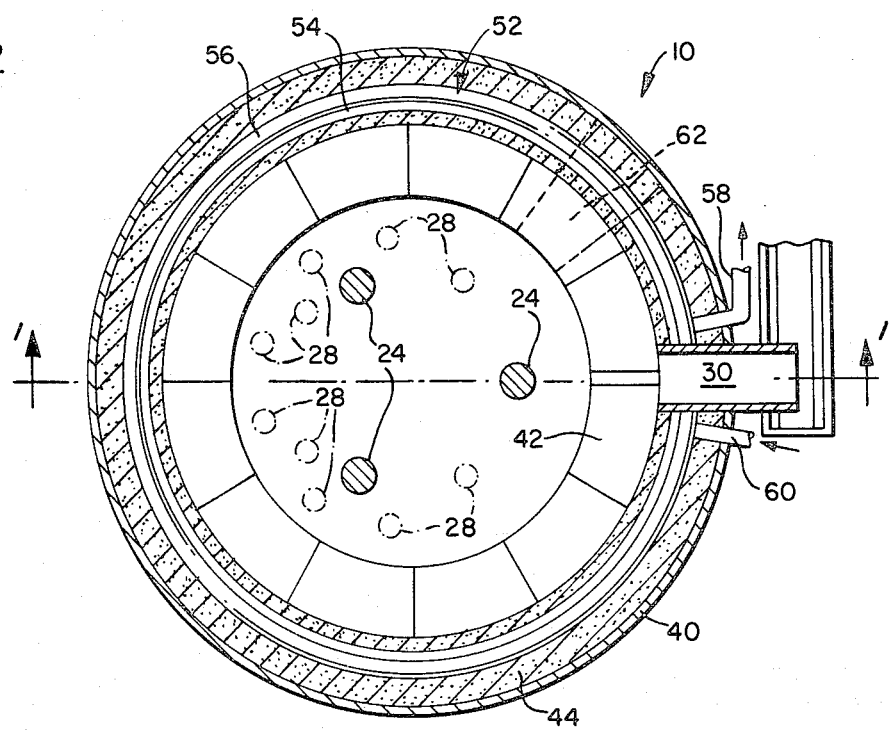
FIG. 2 is a cross-section on line 2—2 of FIG. 1.

In the drawings, the electric melting furnace of the present invention is generally designated by the reference numeral 10, and as shown in FIGS. 1 and 2, is in the form of a cylindrical vessel having an interior melt chamber 14 defined by a bottom wall or floor 16, vertical sidewalls 18 and a top wall 20 established by a cover or crown 22. Heat transfer from the high temperature melting chamber 14 to the exterior of the furnace is substantially inhibited by a thermal insulation system in the walls 16, 18 and 20 to be described in more detail below.

As shown most clearly in FIGS. 1 and 2, a plurality, specifically three carbon electrodes 24 are supported to extend through openings in the cover or crown 22. The electrodes 24 depend from an exterior support 26 to extend substantially into the melt chamber 14 and operate conventionally to heat a liquid or glass melt contained in the chamber 14 by submerged arc heating, resistance heating or a combination of these types of electrical heating. A plurality of tubes 28 extend through the cover or crown 22 and are arranged in a pattern such that a particulate material feed may be introduced to discrete areas uniformly spaced about the horizontal area of the chamber 14 except in an area or region in the proximity of a melt discharge slot or trough 30 through which a molten glass melt is discharged from the chamber to a fiberizer (not shown) and by which the melt is converted to fiber from in the production of rock wool insulation, for example.

The system of thermal insulation incorporated in the walls of the furnace 10 is important to thermal efficiency and to the attainment of a substantially homogenous liquid melt in the chamber 14. Thus, the crown 22 is constituted by an outer structural support which includes a steel shell 32 and in practice may include a frame or grid of structural members (not shown). A relatively thick inner layer 34 of cast refractory is supported from the exterior structure or shell 32 by hangers 36. A layer 38 of refractory insulation is sandwiched between the exterior steel shell 32 and the refractory layer 34.

The bottom and side walls of the furnace 10 are formed by an exterior, substantially sealed steel shell 40, an inner lining 42 of carbon brick and an outer lining 44 of a plastic carbon refractory exemplified by a carbon material commercially available from Union Carbide Corporation under the name "COLD RAMMING CARBON PASTE, Grade RP-3". As may be seen in FIG. 1, the carbon brick 42 extends upwardly from the floor 16 along the sidewalls 18 of the furnace to an upper edge or course 46 which lies in a horizontal plane 48 defined by the level of liquid melt in the chamber 14. A ring 50 of cast refractory extends between the top edge 46 of the carbon brick 42 and the under surface of the refractory layer 34 in the crown 22.

At the level of the plane 48 separating the top edge 46 of the carbon brick 42 and refractory 50 and spaced outwardly from the outer surface of the carbon brick 42 is a water cooled ring 52. The ring 52 includes a fin-like plate 54 welded or otherwise integrated with a conduit 56 for a coolant such as water circulated through inlet and outlet conduits 58 and 60, respectively, as illustrated in FIG. 2.

The outlet 30, in practice, is formed of steel, lined with refractory and is cooled by water circulation to develop a protective coating of solidified melt. Also, a water cooled carbon block 62 in the bottom of the vessel includes a removable plug (not shown) to drain iron and other such heavy materials from the chamber 14.

It is understood that a water jacket, or the like, may be disposed around the shell 40 for safety purposes, or other reasons.

In the operation of the furnace 10 to convert a variety of mineral stock material exemplified by such mineral oxides as blast furnace slag, basalt, feldspar and electrophos slag, the raw stock material, supplied preferably in particulate form ranging in particle size from $\frac{1}{2}''$ to $1\frac{1}{2}''$, is preheated to temperatures above the slaking temperature thereof in order that all volatile oxides such as carbon dioxides and the like as well as chemically combined water are removed from the particulate stock material before it is introduced into the melting chamber 14 of the furnace 10. Because of the spacing and location of the feed tubes 28, the preheated rock is deposited on the top of the melt or liquid glass in the chamber 14 at discrete, spaced zones or areas to develop small individual piles of the unmelted but preheated raw material. The granules of the material roll off of the piles and are assimilated in the liquid melt very rapidly. Also, it is to be noted in this respect that the spacing of the zones of raw material feed avoids the development of a fused, ice-like layer under the solid stock material which can impede the assimilation of the stock material into the liquid melt.

Materials of the type mentioned melt at temperatures above 1700° F. and may be preheated to temperatures in the range of between 1500° F. and 2000° F. prior to introduction to the furnace 10. Although the resulting composition of the melt in the chamber 14 may vary, a typical example of melt composition resulting from stock materials of the type mentioned is represented by the following:

| Compound | Percentage by Weight | Variation (+ or −) |
|---|---|---|
| $SiO_2$ | 40% | 3% |
| CaO | 37 | 3 |
| MgO | 10 | 2 |
| $AL_2O_3$ | 9 | 2 |
| FeO | 2 | 2 |
| Other | 2 | 1 |

Materials of this type are corrosive to substantially all refractory materials known except carbon. Also, the atmosphere above such a melt is corrosive to many refractories. For this reason it is preferred that the layer of cast refractory 34 on the underside of the crown 22 as well as the refractory ring 50 be bubbled alumina. This type of cast refractory is highly resistive to the volatile caustic fumes emanating from the liquid melt and is as well a good thermal insulator. Hence, it is preferred in those portions of the inner lining of the furnace which are exposed to the atmosphere above the melt.

Figure 3:
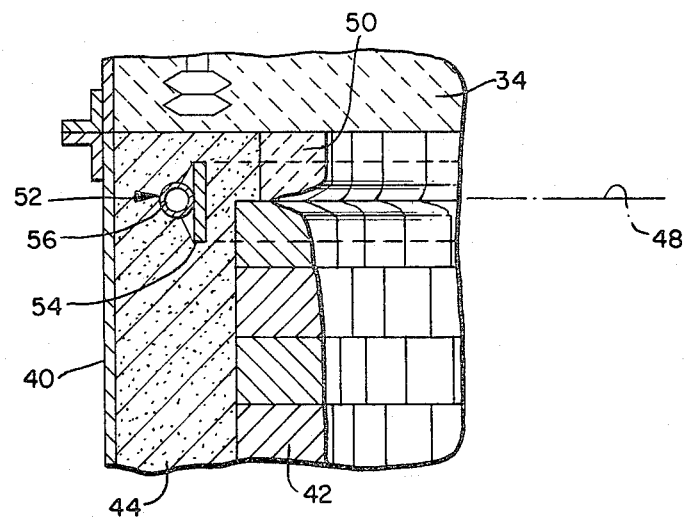
FIG. 3 is an enlarged fragmentary cross-section depicting deterioration of the refractory lining as a result of the corrosive effects of the liquid melt contained in the furnace.
Figure 4:
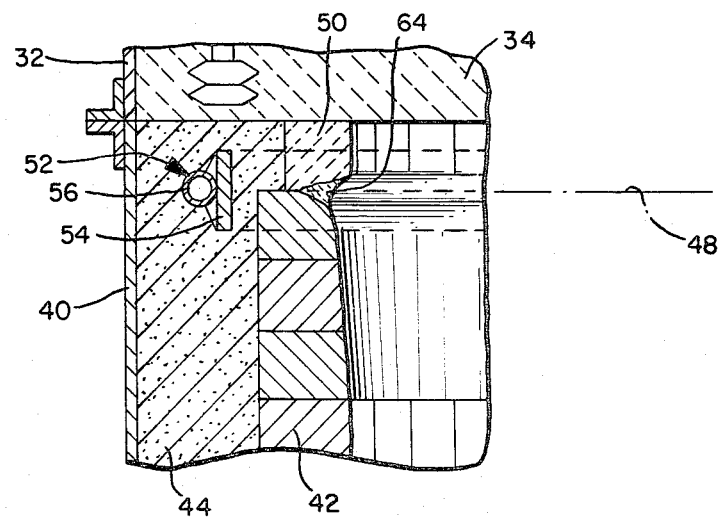
FIG. 4 is a fragmentary cross-section similar to FIG. 3 but illustrating the development of a solidified glass lining as a result of operation of the invention.

Because the carbon brick 42 will burn in air or when exposed to oxygen, maintaining the level of molten rock constantly at the plane 48 assures that the carbon brick will at all times be submerged in the molten rock. The level of the liquid melt will vary slightly, however, and result in a deterioration or erosion of both the upper course of carbon brick 42 and the ring 50 of bubbled alumina in the upper region of the chamber 14. To prevent this deterioration of the refractory lining from progressing beyond an acceptable limit as represented, for example, in FIG. 3, a thermal equilibrium is developed in the glass melt by the cooling ring 52 so that a narrow band of solidified glass 64 will develop between the liquid glass and the inner surface of the furnace walls in the region of the cooling ring 52 as shown in FIG. 4. Deterioration of the linings above and below the liquid line beyond the approximate condition shown in FIG. 4 is prevented by the development of a solid glass wedge in a region or band corresponding to the cooling effect of the cooling fin 54.

In the disclosed embodiment, the cooling ring 52 is embedded in the outer carbon paste lining. While variations in the particular structural organization of the ring may be made without significant change in results, it is important that the cooling ring 52 be preferably spaced from between 1 and 3 inches from the outer surface of the carbon brick 42.

It is to be noted that the outer lining of carbon paste functions not only as thermal insulation by which the transfer of heat from the chamber 14 is reduced substantially, but also as a replaceable intermediate barrier between the outer shell 40 and the inner lining of carbon brick 42. For example, any of the liquid melt which may pass through the carbon brick would be contained by the inner surface of the carbon paste or outer lining. Similarly, any oxygen which may pass from the atmosphere through the outer shell 40 will react with the outer lining 44 and thus be prevented from contacting the carbon brick 42. In fact, an abundance of oxygen may result in some burning of the carbon paste outer lining 44 but the nature of this material coupled with its containment directly by the steel shell 40, facilitates its ready replacement. In this respect, the thickness of the outer lining of carbon paste preferably is in the range of from 9" to 15" whereas the thickness of the carbon brick may be between 6" and 12" depending on the overall size of the furnace 10.

Thus it will be appreciated that as a result of the present invention, a highly effective melting furnace is provided by which the above-mentioned objectives are completely fulfilled. It is equally apparent that modifications and/or changes may be made in the disclosed embodiment without departure from the invention. Accordingly, it is expressly intended that the foregoing description is illustrative of a preferred embodiment, not limiting, and that the true spirit and scope of the present invention be determined by reference to the appended claims.

We claim:

1. A glass melting furnace comprising:
    top, bottom and side walls to define a melt chamber, each of said bottom and side walls including a substantially sealed external shell and a carbon lining of sufficient thickness to inhibit the transfer of heat from a liquid melt contained in said chamber;
    electric means for heating the liquid melt contained in said chamber; and
    means to maintain the top of said liquid melt at a predetermined substantially constant distance from the bottom of said chamber;
    said carbon lining extending from said bottom wall upwardly along said sidewalls and terminating at an upper edge lying at a plane defined by the top of said liquid melt.

2. The apparatus recited in claim 1, wherein said carbon lining comprises an inner lining of carbon brick and an outer lining of carbon paste.

3. The apparatus recited in claim 1, wherein said sidewalls comprise an inner lining ring of refractory material on the upper edge of said carbon lining.

4. The apparatus recited in claim 3, including a cooling ring on the exterior of said lining at the approximate level of said plane to form a solidified band of said glass melt on the inner juncture between said lining ring and said carbon lining.

5. The apparatus recited in claim 4, wherein said cooling ring comprises a water pipe and a heat transfer fin secured to said water pipe.

6. The apparatus recited in claim 1, wherein said top wall is defined by a crown having a lining of refractory material.

7. The apparatus recited in either of claims 3 or 6, wherein said refractory comprises bubbled alumina.

8. The apparatus recited in claim 1, wherein said electric means comprises a plurality of carbon electrodes extending vertically through said top wall and external means to support said electrodes.

9. The apparatus recited in claim 1, wherein said means to maintain the top of said liquid melt at a predetermined substantially constant distance from the bottom of said chamber comprises a liquid glass outlet opening near the top of said sidewalls and means to continuously introduce particulate stock material to the top of said chamber.

10. The apparatus recited in claim 9, wherein said means to introduce particulate material to the top of said chamber comprises a plurality of spaced inlet openings distributed throughout a substantial area of said top wall.

11. In an electric glass melting furnace having a melt chamber defined by top, bottom and side walls and means to maintain the top of a liquid melt in said chamber at a predetermined, generally constant distance from the bottom of said chamber, the improvement comprising:
- a substantially sealed external shell covering at least said bottom and side walls;
- an inner lining of carbon brick on said bottom and side walls extending up to and terminating at a plane defined by the top of the liquid melt in said chamber; and
- an outer lining of carbon paste on said bottom and side walls between said inner lining and said outer shell.

12. The apparatus recited in claim 11, wherein said inner lining comprises a ring of bubbled alumina extending from the top of said carbon brick to the top of said sidewalls.

13. The apparatus recited in claim 12, wherein said outer lining and said exterior shell extend to the top of the sidewalls to establish with said ring a flush upper edge in said sidewalls.

14. The apparatus recited in claim 13, wherein the top wall comprises an inner lining of bubbled alumina having a flush outer edge to rest directly on said flush upper edge of said sidewalls.

15. The apparatus recited in either of claims 13 or 14, including water cooling means outside of said inner lining at the level of said plane.

16. The apparatus recited in claim 15, wherein said water cooling means comprises a water circulating conduit and a vertical plate secured to said conduit.

* * * * *